United States Patent

Kennedy

[15] 3,685,002

[45] Aug. 15, 1972

[54] SOCKET DEVICE FOR CONNECTING CIRCUIT COMPONENTS WITH A CIRCUIT BOARD

[72] Inventor: James D. Kennedy, 4420 Regents Court, Westlake Village, Calif. 91360

[22] Filed: July 7, 1970

[21] Appl. No.: 52,958

[52] U.S. Cl.....339/17 CF, 174/DIG. 3, 317/101 CC, 339/192 R, 339/218 M, 339/256 R

[51] Int. Cl. ................................................H05k 1/02

[58] Field of Search..317/101 R, 101 C, 101 CC, 101 CP, 317/101 DH; 339/17, 18 R, 18 C, 18 P, 75 M, 75 MP, 102 R, 174, 217 R, 252 R, 256 R, 256 S, 150 B, 151 B, 192, 176, 198; 174/DIG. 3; 29/472.5, 472.9, 473.1, 505, 515, 626–630

[56] References Cited

UNITED STATES PATENTS

| | | | |
|---|---|---|---|
| 3,525,972 | 8/1970 | Asick et al. | .............339/64 M |
| 3,126,244 | 3/1964 | Raygor et al. | .......339/217 R X |
| 2,543,000 | 2/1951 | Dearkin | .................339/192 X |
| 3,537,061 | 10/1970 | Haag et al. | ..............339/31 M |

*Primary Examiner*—Marvin A. Champion
*Assistant Examiner*—Terrell P. Lewis
*Attorney*—Spensley, Horn & Lubitz

[57] ABSTRACT

A socket contact device for connecting a circuit component such as an integrated circuit package to a circuit board such as a printed circuit board is disclosed. The device comprises a socket contact having a plurality of interconnected ribbon-like spring segments which are distorted during insertion into apertures in the circuit board. The contact is secured by the multiple spring segment pressures acting within the aperture in the circuit board in such a manner that electrical contact is made between the socket contact and both the upper and lower surfaces of the circuit board. Portions of the interconnected spring segments protrude above the circuit board and are so disposed that they may be received and captivated within an insulative header which may be organized to locate the contacts in a plurality of interrelated positions. Pins coupled to a circuit component are forced to pass (through apertures in an insulative header if used) between opposing spring segments of the socket contact which are thereby distorted to hold the circuit component pin at dual pressure points within the board aperture. Insertion pressures simultaneously enhance electrical conductivity between both surfaces of the printed circuit board and the contact. Since the pins of the component and the socket contact are at least in part contained within the circuit board, a low profile connection is achieved. Neither metal soldering, wire wrapping nor crimping are required. A pair of the interconnected spring segments comprising the socket contact project significantly below the surface of the printed circuit board to provide an isolated, easily accessible test point. The connection has high mechanical strength and vibration resistance. The socket contact and corresponding component lead may be soldered to the circuit board by conventional means after operational testing.

9 Claims, 7 Drawing Figures

JAMES D. KENNEDY
INVENTOR.

BY Spensley, Horn & Lubitz
ATTORNEYS

JAMES D. KENNEDY
INVENTOR

BY Spensley, Horn & Lubitz
ATTORNEYS

SOCKET DEVICE FOR CONNECTING CIRCUIT COMPONENTS WITH A CIRCUIT BOARD

BACKGROUND OF THE INVENTION

1. Field of the Invention

The invention relates to electrical socket contacts for printed circuit boards adapted to receive electrical contact leads from multi-lead circuit components.

2. Prior Art

Numerous socket devices are known in the prior art for interconnecting circuit components with printed circuit boards. Many of such devices are single contact only and are not adaptable for preattachment in an array on an insulative header which allows simultaneous insertion of a plurality of contacts. A majority of the single and plural devices have the initial disadvantage of requiring soldering, wire wrapping or crimping into board apertures in order to achieve a satisfactory electrical connection with the printed circuit board. A majority of the plurally-mountable devices in insulative headers receive the electrical leads from circuit components in the space above the printed circuit board, are therefore wasteful of space and do not permit high-density electronic assembly. In addition to high profiles which limit circuit board density, a majority of the disclosed devices have no provision for insuring contact between the spring element and the top conductive surface of a printed circuit board. None of the contacts made by such devices are a pressure grip or bite type of contact.

In one U.S. Letters Patent, a socket contact for printed circuits is disclosed which claims that soldering is not required. This device is insertable from the bottom surface of a printed circuit board and has major disadvantages; tabs which pop out over the upper surface of the board must be configured to accommodate the largest thickness tolerance of the printed circuit board. This limitation prevents proper contact from being made on either the top or the bottom surface of a majority of minutely thinner boards, unless solder is used. Another disadvantage is that insertion of a component lead into the socket contact increases the pressure between the socket contact and the fragile plated walls within the aperture of the printed circuit board. A further disadvantage of this specific device is that, being inserted from the bottom of the board, it cannot be held in an insulated header conventionally located on the upper, non-soldered surface of the printed circuit board. The bottom location of an insulative header would interfere with subsequent soldering operations and tend to retain solder which could short between adjacent socket contacts.

SUMMARY OF THE INVENTION

A socket contact device for connecting circuit components such as integrated circuit packages with a circuit board such as a printed circuit board is disclosed. The socket contact comprises an interconnected opposing pair of symmetrically shaped ribbon-like spring sections, each having an upper projects sufficiently surface contact knee, an inwardly bowed center section, a lower surface contact ramp terminating in an elbow arc and an interconnecting point common to both symmetrical sections. The upper surface contact knee and the lower surface contact ramp are in pressure opposition to each other, and the space between these two socket contact elements is less than the lowest tolerance of thickness of any printed circuit board for which the socket is intended. Inner surfaces of the inwardly bowed spring sections engage inserted pins or leads from a circuit component with a pressure contact. Spring distortion, resulting from pin insertion, simultaneously enhances contact of other elements of the spring section with surfaces of the printed circuit board. The common interconnecting point projects sufficiently below the printed circuit board to provide an isolated testing point.

The upper surface contact knee is so conceived that it may be extended upward and be held captive by an insulative header. By this means, a plurality of socket contacts may be pre-attached to an insulative header in any desired array for simultaneous insertion into a plurality of similarly arrayed apertures in a printed circuit board. The lower surface of such an insulative header contains a plurality of grooves into which projections of the socket contact may be inserted and in which they may be captivated by conventional insulative means such as glueing, wedging, filling, thermal distortion or ultrasonic pressure flow. These grooves are adjacent to a matching plurality of apertures through which pins or leads from the circuit component may be inserted in alignment with the inward bows of the socket contacts.

An object of the present invention is to provide a low profile socket contact device which provides a low resistance connection between the electrical lead of a circuit component and a printed circuit board without soldering wire wrapping, crimping, or other non-integral fixating techniques.

It is another object of the invention to provide a socket contact device which permits the testing of active circuit components and circuit continuity without soldering, and which further permits the soldering of the component lead to the inward bow of the socket contact and the soldering of the contact ramps to the lower surface of a printed circuit board after such active circuit testing has occurred.

A further object of the invention is to provide a socket contact device in which after-test soldering can be accomplished by manual soldering with soldering iron, dip soldering, flow soldering or reflow soldering of pre-tinned contacts and boards of any means of heat application.

Still another object of the present invention is the provision of a socket contact which accommodates both high and low tolerance circuit board thickness without sacrificing contact integrity.

Yet another object of the invention is to provide a socket contact which does not require a plated circumference within the aperture of the printed circuit board.

A still further object of the invention is the provision of a socket contact which may be economically produced in a continuous string (a continuously interconnected comb-like series of socket contact units which may be severed to create individual socket contacts).

An additional object of the present invention is to provide a socket contact which may be held captive within an insulative header conventionally located on the upper surface of a printed circuit board.

A further additional object of the present invention is to provide a socket contact which is attachable to an insulative header as a continuous interconnected string of spaced socket contact units and which may be severed after being captivated in the insulative header to create individual socket contacts in a plurality of positions by a most inexpensive production means.

Other objects and many attendant advantages of this invention will be readily appreciated as the same becomes better understood by reference to the following detailed description and operational summary when considered in connection with the accompanying drawings in which like reference numerals designate parts throughout the figures thereof.

DETAILED DESCRIPTION OF THE INVENTION

Figures 1, 2:
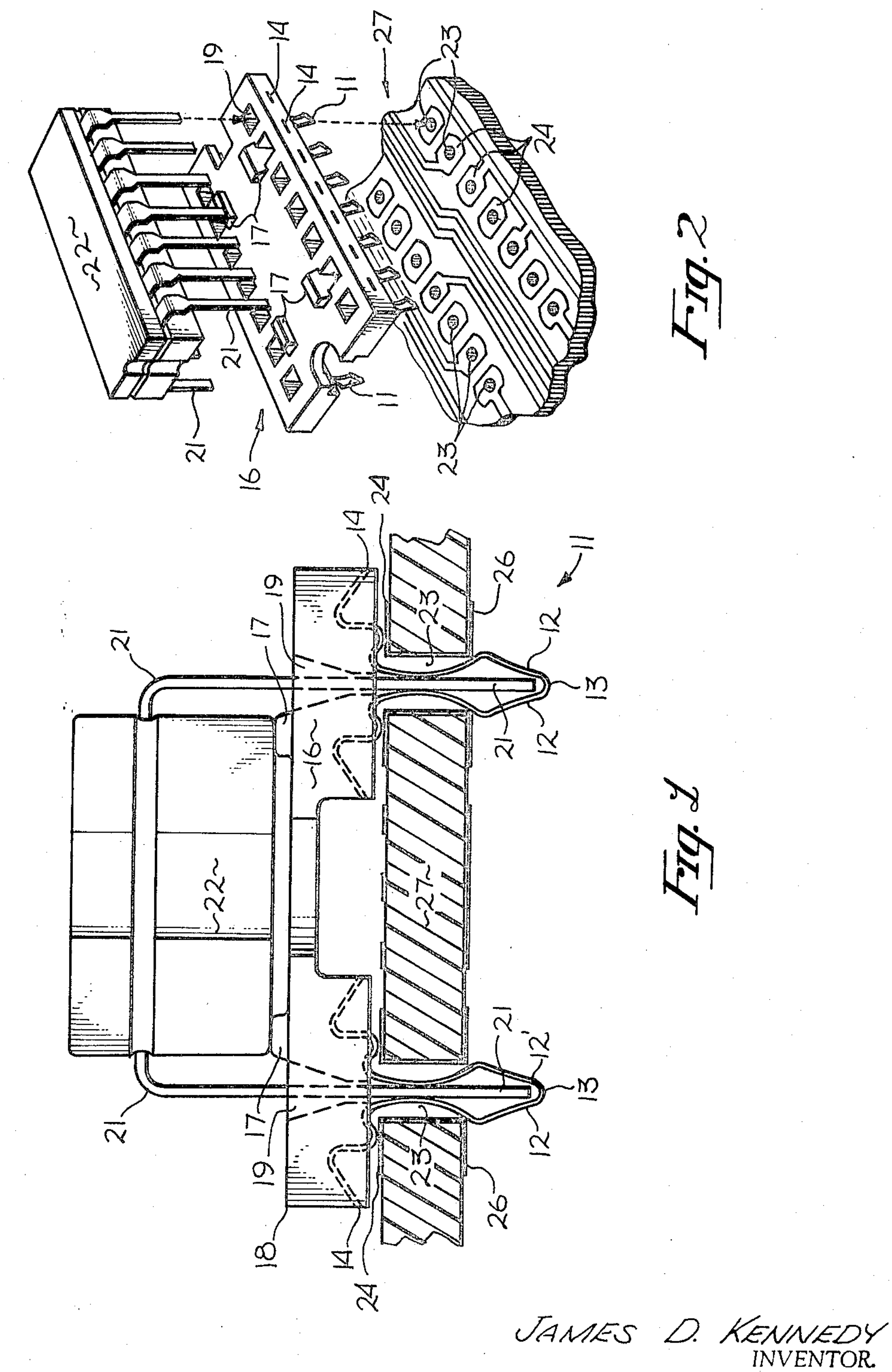
FIG. 1 is an end view of a circuit component with leads engaging the socket contact devices of the present invention and an aligned view of an insulative header laying above the cross section of a printed circuit board.
FIG. 2 is an exploded perspective view of the assemblies of FIG. 1.

Referring to FIGS. 1 and 2, subject contacts 11, comprised of opposing symmetrical spring sections 12 and 12' joined at interconnecting point 13 and terminating in shear points 14 and 14' are held captive near the bottom surface 15 of an insulative header 16. A plurality of insulative bosses 17 project from upper surface 18 of the insulative header 16 between parallel rows of a plurality of apertures 19 which communicate between the upper surface 18 and the lower surface 15 of the insulative header 16. The insulative header 16 is therefore adaptable for guiding electrical leads 21 of circuit component 22 along the centerline of socket contacts 11 which lie partly within apertures 23 and communicate conductively with upper metallic pads 24 and lower metallic pads 26 of a printed circuit board 27. Referring to FIG. 2, the elements previously referenced are shown in perspective and in exploded, unassembled relationship to one another.

Figures 3, 4, 5:
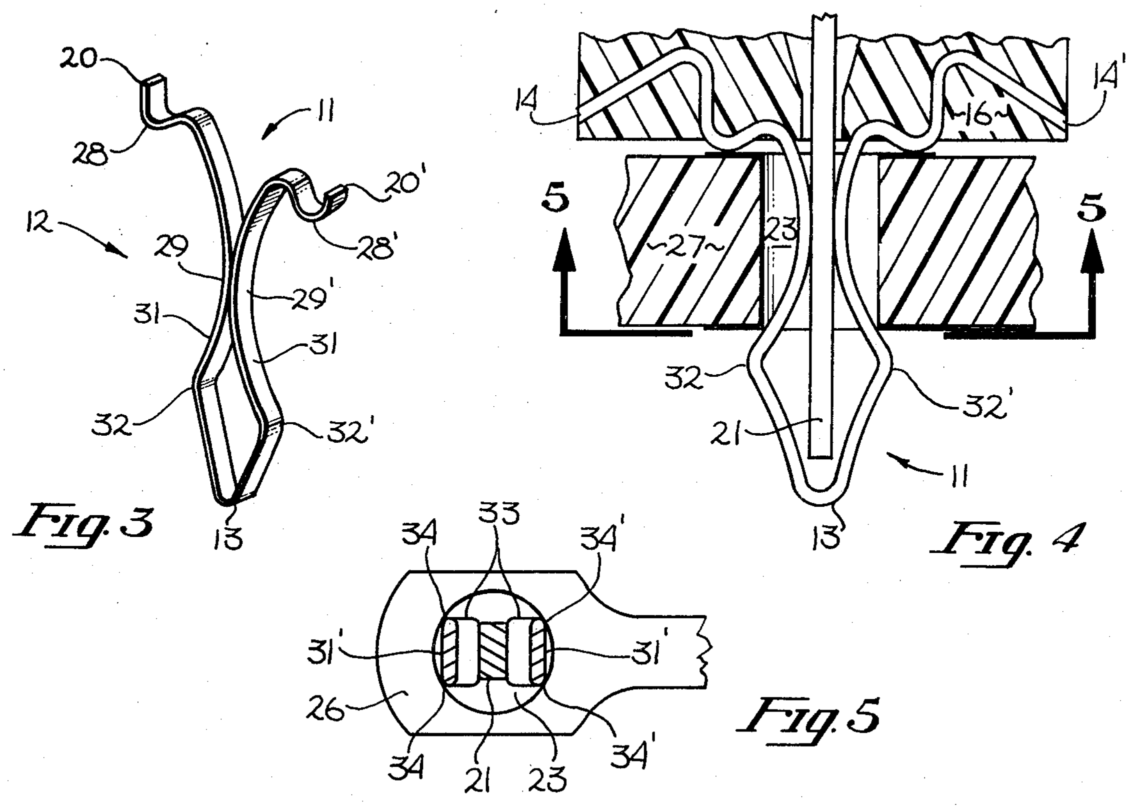
FIG. 3 is a perspective view of a socket contact.
FIG. 4 is a view of a socket contact held captive in a cross section of an insulative header through which passes a view of a component lead, all of these being positioned in operating relationship with a cross section of a printed circuit board containing a typical aperture.
FIG. 5 is a bottom view of a printed circuit board with aperture as indicated in FIG. 4 together with cross sections and views of the socket contact and a component lead.

Referring to FIG. 3, the opposing symmetrical conductive spring sections 12 and 12' comprising the simplest configuration of socket contact 11 are joined at interconnecting point 13 and terminate in shear points 20 and 20' and are composed of an upper surface contact knee 28 and 28' contiguous with an inwardly bowed contact section 29 and 29' which is contiguous with and is oriented above a lower surface contact ramp 31 and 31' which terminates in an elbow arc 32 and 32'.

Referring to FIG. 4, the inwardly bowed contact sections of socket contact 11 are shown in conductive communication with an electrical lead 21 from a circuit component (not shown). The elbow arcs 32 and 32' on either side and above the interconnecting point 13 extend well beyond the greatest horizontal dimension of aperture 23 in printed circuit board 27.

Referring to FIG. 5 (a bottom view and section from FIG. 4), the electrical lead 21 of a circuit component (not shown) is in conductive communication with the inwardly bowed contact section of socket contact 11 at contact lines 33. The lower surface contact ramps 31 and 31' of socket contact 11 conductively communicate with the lower metallic pad 26 at multiple contact points 34 and 34' which lie on the circumference of aperture 23.

Figure 6:
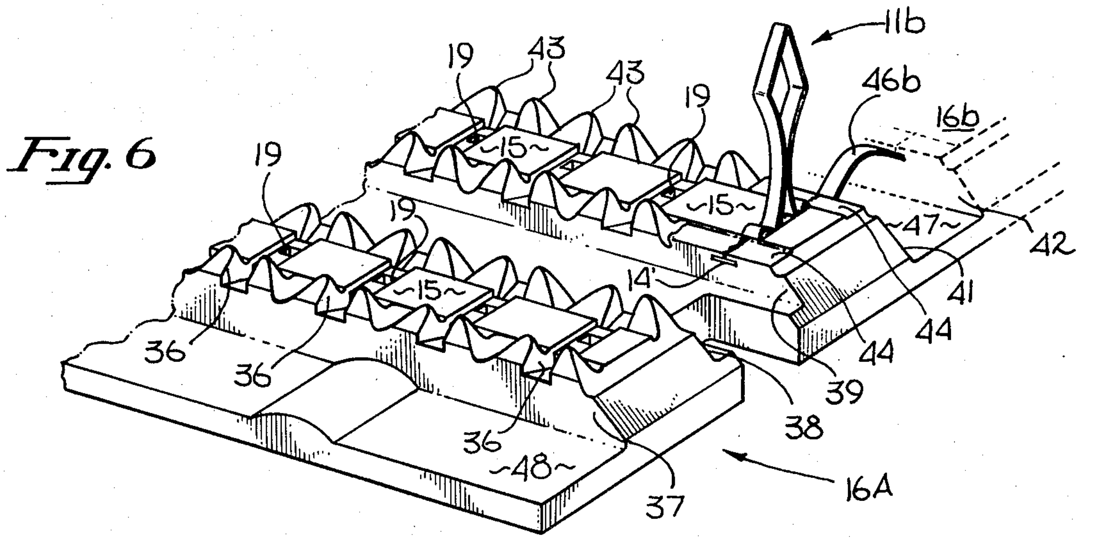
FIG. 6 is a perspective view of an inverted insulative header containing a captivated socket contact.

Referring to FIG. 6, an inverted insulative header is illustrated with lower surface 15 uppermost and with a plurality of apertures 19 which communicate between bottom surface 15 and the upper surface (not shown) of insulative header **16*a*. Apertures 19 specifically communicate with a plurality of specially shaped socket contact grooves 36 which terminate at shearing surfaces 37, 38, 39 and 41. The opposing walls of socket contact grooves 36 are extended upward near their outer terminations to form a plurality of insulative staking tips 43 which, by the application of pressure and heat or sonic energy, may be distorted to form flat areas 44 which effectively captivate socket contact 11. Shear point 14' of socket contact 11 is shown smoothly identical with shearing surface 39. At the far side of socket contact 11 is illustrated a shearable contact bridge 46 by which individual socket contacts may be developed into a string of contacts for ease of application. This shearable contact bridge 46 is shown entering an adjacent insulative header 16*b* through shear surface 42 and bridging over a shearable web section 47 which temporarily interconnects adjacent plastic headers 16*a* and 16*b* to form a larger plate of headers. A reinforced shearable web 48 extends from shear surface 37 of insulative header 16*a* and serves as a temporary spacer between insulative header 16*a*** and another separate plate of insulative headers (not shown).

Figure 7:
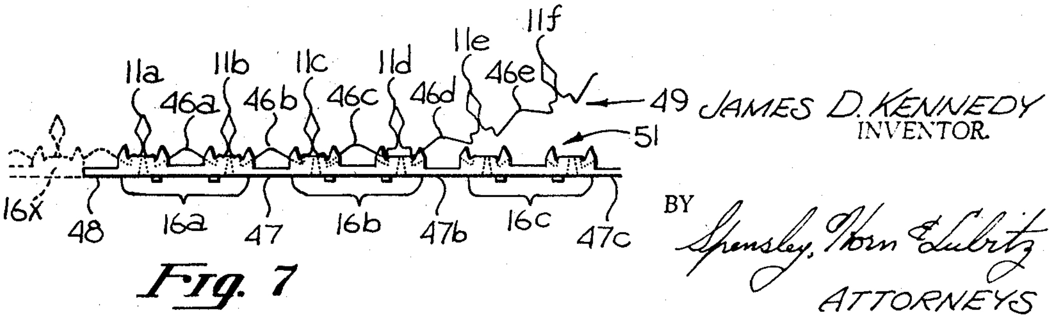
FIG. 7 is a profile view of a continuous string of socket contacts meshing with a semi-continuous array of spaced insulative headers.

Referring to FIG. 7, a comb-like string 49 of interconnected socket contact 11 is shown with the first two socket contacts **11*a* and 11*b* fully seated in the grooves of insulative header 16*a*. Subsequent interconnected socket contacts 11*c* and 11*d* are partially engaged with insulative header 16*b* and contacts 11*e* and 11*f* are in general alignment with appropriate grooves in insulative header 16*c*. Headers are appropriately spaced by temporary shearable webs 47 to establish a plate of headers 51. Reinforced shearable web 48 is shown in contact with the last header 16*x*** of an adjacent plate.

OPERATIONAL SUMMARY

The round-edged, ribbon-like spring of the socket contact 11 may be inserted through an aperture in a printed circuit board 27. The arrow-like tip is compressed to the size of the aperture by the insertion pressure but springs out toward its original shape when the elbow arcs 32 and 32' emerge from the bottom surface. Penetration by the socket contact is limited by upper surface contact knees 28 and 28' so that the lower surface contact ramps 31 and 31' are still held by spring tension against the metal laminate 26 on the lower surface of a printed circuit board 27. This wedging tension also effects a closer contact between the upper surface contact knees 28 and 28' and the metal laminate 24 on the upper surface of the board. Plated-through apertures are not required, but insertion does not destroy an internal plating since sliding contact load is spread over four smoothly rounded areas (34 and 34', FIG. 5) at the edges of the ribbon-like contact spring. Soldering, wire wrap and crimping are not required to connect the socket contact 11 to the circuit board 27.

A circuit component lead 21 of any reasonable thickness may be forced down between the inwardly bowed contact sections 29 and 29' of the installed socket contact 11 to create low resistance electrical continuity with the laminated metallic surfaces 24 and 26 on the printed circuit board 27. Insertion pressures force the upper knees 28 and 28' into closer contact with the upper conductive surface 24 and distort the lower ramps 31 and 31' to create a closer contact with the lower conductive surface 26. At least two conductive contacts are created between the knees 28 and the upper surface 24; two are created by the inward bow pressure 29 and 29' on the component lead 21 and four conductive contacts 34 and 34' are supplied by the ramps acting against the lower surface. Neither solder, wire-wrap nor crimping is required to attach the circuit component lead 21 to the socket contact 11.

When a plurality of pre-arrayed socket contacts are desired, shear points 20 and 20' (FIG. 3) are deleted in favor of shear points 14 and 14' (FIGS. 1, 4, and 6), and the extended ribbon-like spring elements are fitted into matching grooves 36 (FIG. 6) in the insulative header 16. They may be made captive by distorting insulative staking tips 43 through application of pressure and ultrasonic vibration to create flat areas 44 which fill grooves 36 containing the ribbon-like arms of socket contact 11 without impairing important socket contact actions previously described. Apertures 19, extending through the insulative header 16, guide component contact leads, like 21, along the centerline of socket contacts held captive by a header.

Performance testing can now begin. A test lead clamp can be readily connected to the downward projecting point 13 of socket contact 11 or the entire interconnected circuit on the board may be tested in operation. When a specific circuit component attached to a lead 21 is proven faulty, it may be unplugged and replaced. A short operational life test is a standard procedure within the electronics industry; many of the failure-prone circuit components will fail and require replacement after a few short hours of operational "-burn-in".

Without soldering, wire-wrapping or crimping, the operating circuit board has been made ready for delivery, BUT shipping shocks and in-use vibration can loosen any socketed component. Soldering, etc. which would have been of major disadvantage in the previous assembly and testing procedures will at this point provide distinct advantages and may be definitely required. It is in this area of conflicting sequential requirements that the present invention fulfills many of the stated objectives.

The non-tubular shape of the ribbon-like socket contact 11 creates within the circuit board aperture 23 numerous interconnecting capillary areas. The point 13 of the socket contact 11 projects sufficiently to be firmly contacted by a hot soldering iron or to enter a pool or fountain of molder solder and conduct heat from that source up to the spring segments lying within and above the aperture. Through contact areas 33 (FIG. 5) heat is also transferred to component lead 21. Molten solder is therefore attracted inward and upward into the capillary areas within aperture 23 by natural surface tension phenomena so that all portions of the socket contact 11 are conductively bonded to the component lead 21 and to the internal plating of the aperture if it is also present. Neither shock nor vibration can now dislodge the component lead 21 from the socket contact 11 or the socket contact from the printed circuit board 27.

An improved contact may also be effected using a solder-preplated socket contact such as 11 and an inserted preplated component lead such as 21, assembled in a preplated circuit board such as 27 and heating with a blast of hot air, a soldering iron or in a heated oil bath so that the preplatings become liquid and reflow together to form a conductive bond. Bonding may also be effected with a hot soldering iron and additional solder.

AUTOMATION SUMMARY

To be of value to the realm after a period of individual control, an invented device must perform desirable functions and simultaneously be producible at an expense commensurate with the advantages provided by those functions. It is in this area of simultaneous requirements that the present invention fulfills other of the stated objectives. Basic accommodative elements which permit automated assembly are an integral part of the invention.

The socket contacts 11 of the present invention are producible as a continuous, comb-like string 49 of socket contacts 11 interconnected by bridges like 46 (FIGS. 6 and 7). Individual socket contacts may be sheared from the string at any point which does not limit their prime functions and are most frequently separated from string at shear points 20 and 20' (FIG. 3) for use without a header or at shear points 14 and 14' after being made captive in an insulative header such as 16.

One form of insulative header 16*a* (FIGS. 6 and 7) facilitates acceptance and captivation of comb-like strings 49 of socket contacts 11 by providing appropriately spaced grooves 36 staking tips 43 previously explained. Low cost shearing of socket contacts 11 after assembly is facilitated by identically spaced pairs of parallel shearing surfaces such as 38–39 and 41–42 and also by the shearable web 47 which effects the appropriate spacing between header 16*a* and header 16*b*. Reinforced shearable web 48 also contributes to automation by spacing a plate 51 of insulative headers, comprising 16*a*, 16*b* and others, at the appropriate shearing distance from the last header of a similar adjacent plate 16*x*.

The following highly automated assembly sequences are made possible by features inherent in the present invention.

A socket contact groove 36 of an insulative header such as 16*a* at the leading edge of a plate 51 may be manually "loaded" with the socket contacts 11*a* and 11*b* at one end of a comb-like string 49. The remaining parallel grooves 36 of header 16*a* may be similarly loaded with other comb-like strings. These may then be made captive by ultrasonic staking tools in pressure contact with staking tips 43 which flow into the grooves 36 and are reduced to flats like 44.

Socket contacts 11*c* and 11*d* adjacent to contacts 11*a* and 11*b* automatically align with socket contact grooves like 36 in the adjacent line of insulative headers 16*b*; and, as these in turn are captivated, other contact alignments 11*e* and 11*f* are perpetuated to yet another adjacent line of headers 16*c*. Ribbon-like bridges 46 extend or retract to accommodate slight mismatches in dimensions expected from normal production tolerances. As these automated actions occur and as the trailing edge of a plate 51 of interconnected insulative headers 16 approaches the staking tool, another plate of headers may be aligned with and abutted to the trailing edge of the original plate by automated means. Reinforced shearable web 48 insures a proper spacing. Since alignment is perpetuated, further manual assistance is not required until the plurality of long socket contact strings 16 have been made captive, over their full length, in an equivalent number of insulative headers organized into plates 51.

At a first "pause" station, the aligned series of header plates and comb-like contact strings may pause for staking at the ultrasonic staking tools; it is possible to position additional automated operations at other "-pause" positions following the staking operation.

At a second "pause" position, dual knife edges move into abuttment with internal shear surfaces like 38 and 39, move down on the ribbon-like socket contact string, shear it against the compressive "bucking" strength of the insulative material as shown at 14' and move out of the area leaving sheared bridges like 46 on the horizontal header surface.

At a third sequential "pause" position, a pointed tool, with vacuum intake immediately adjacent, moves down the center of the horizontal surface between shear surfaces 38 and 39, lifts the severed bridges like 46 and removes them via the vacuum stream.

At a fourth sequential "pause" station when each header plate contains a second row of headers (not shown) parallel to but horizontally displaced (as to the left in FIG. 6) from 16*a*, 16*b*, 16*c*, etc., the two or more rows are also interconnected by shearable webs which are notched out of the plate by a downward-moving punch and a mating die spanned by the shearable web.

At a fifth and final sequential "pause" station, knife edges move into abuttment with external shear surfaces like 37, 41 and 42, move down on the ribbon-like contact string and shear it, move further down on the shearable web such as 47 and shear it against an appropriate shear seat spanned by the shearable web. Since the shearable webs between rows of headers were notched out at "pause" station four, this final cut totally removes the individual header assembly from the remainder of the header plate; assembly is complete. Each pause in the automated sequence is identical, and the sequence is not further slowed down by the operations occurring at "pause" stations two through five.

No socket contact of known prior art, meeting all the stated objectives, can be created by automated sequences of comparable efficiency.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention.

We claim:

1. A connector device for connecting a circuit component such as an integrated circuit package with an exemplary horizontal circuit board such as a printed circuit board comprising:
   - a socket body such as an insulative header having a lower surface, an upper surface, and a plurality of socket body apertures disposed through said socket body from said upper surface to said lower surface being adaptable to guide and receive pins coupled to said circuit components; and
   - a plurality of socket contacts engaged with the lower surface of said socket body and disposed downwardly from the socket body substantially collinear with said socket body apertures, each of said socket contacts being adaptable for engaging, extending into and protruding through a circuit board from an upper surface to a lower surface thereof, and each socket contact comprising a continuous springy ribbon-like conductive metallic strip of uniform rectangular cross-section with smoothly rounded corners geometrically shaped for contacting both the upper surface and the lower surface of said circuit board and for simultaneously elastically contacting between said last named surfaces opposite side of a circuit component pin such as an integrated circuit package lead when said component pin extends into said circuit board aperture.

2. The socket body defined in claim 1 wherein said plurality of socket body apertures form two parallel rows adaptable for receiving pins coupled to a dual-in-line circuit component package and wherein the upper and lower surface of said socket body are substantially parallel.

3. The socket body defined in claim 1 wherein each of said socket body apertures communicates with and is centered on a contact groove disposed along the lower surface of said socket body being adaptable for engaging an upper profile portion of said socket contact defined in claim 1 and within which said socket contact may be embedded by such insulative means as polymeric bonding, wedging, filling, thermal distortion or ultrasonic pressure application such as ultrasonic staking, each of said contact grooves comprising:
   - a straight shallow groove zone symmetrically centered on said socket body aperture; and
   - a pair of deep groove zones contiguous and collinear with said shallow groove zone, each of said deep groove zones being equally displaced in opposite directions from said socket body apertures; and
   - a pair of ramp groove zones rising from deep to shallow collinear with said deep groove zones and contiguous with same at the deep end of said ramp groove zones being equally displaced in opposite directions from said socket body aperture.

4. The connector device of claim 1 wherein said conductive metallic strips are bent so as to form a pair of opposing sides substantially symmetrically disposed about a center plain, said sides integrally meeting at the lower end of said socket contacts, said sides extending upward from said lower end with increasing separation to define a wedge shaped lower section, said sides extending upward from the top of said lower section with decreasing separation to a position of least separation wherein said sides are in substantial contact, and upward therefrom with increasing separation to a position adjacent said lower surface of said socket body.

5. A connector device for connecting a circuit component such as an integrated circuit package with an exemplary horizontal circuit board such as a printed circuit board comprising:

a socket body such as an insulative header having a lower surface, an upper surface, and a plurality of socket body apertures disposed through said socket body from said upper surface to said lower surface being adaptable to guide and receive pins coupled to said circuit component, wherein each of said socket body apertures communicates with and is centered on a contact groove disposed along the lower surface of said socket body being adaptable for engaging an upper profile portion of a socket contact and within which said socket contact may be embedded by such insulative means as polymeric bonding, wedging, filling, thermal distortion or ultrasonic pressure application such as ultrasonic staking, each of said contact grooves comprising:

a straight shallow groove zone symmetrically centered on said socket body aperture; and a pair of deep groove zones contiguous and collinear with said shallow groove zone, each of said deep groove zones being equally displaced in opposite directions from said socket body aperture; and a pair of ramp groove zones rising from deep to shallow collinear with said deep groove zones and contiguous with same at the deep end of said ramp groove zones being equally displaced in opposite directions from said socket body aperture; and a plurality of socket contacts engaged with the lower surface of said socket body and disposed downwardly from the socket body substantially collinear with said socket body apertures, each of said socket contacts being adaptable for engaging, extending into and protruding through a circuit board from an upper surface to a lower surface thereof, and each socket contact comprising a continuous springy ribbon-like conductive metallic strip of uniform rectangular cross-section with smoothly rounded corners geometrically shaped for contacting both the upper surface and the lower surface of said circuit board and for simultaneously contacting a circuit component pin such as an integrated circuit package lead when said component pin extends into said circuit board aperture.

6. The socket contact of claim 5 wherein said opposing series of spring segments diverge toward a lower opening of said circuit board aperture resulting in slidable pressure points against said lower opening for being received by circuit boards of varying thickness and for making a wiping electrical contact therewith.

7. The socket body of claim 5 wherein said socket body has first and second substantially vertical shearing surfaces on said lower surface to either side of and equidistant from said socket body aperture for shearing a continuous form of socket contacts upon attachment thereto and at which shearing surfaces said socket contact groove terminates.

8. The socket body of claim 7 wherein:

a shearable web is contiguous with and extends from said upper surface of said socket body in planar equivalence thereto and becomes contiguous with two or more identical adjacent socket bodies thereby creating a monolithic plate of interconnected socket bodies as a master form of socket bodies for automated production and from which may be sheared individual socket bodies.

9. The socket body of claim 5 wherein said embedment is by the specific insulative means of ultrasonic pressure application such as ultrasonic staking and wherein:

a tilted pyramidal staking tip one side being contiguous with one substantially vertical wall of said contact groove in said deep groove zone and said ramp groove zone is located at both ends of said contact groove and both walls of said contact groove projecting from said lower surface of said socket body and is operable as an energy riser for the initial-contact phase of ultrasonic staking and as a source of flowable insulative material for displacement into said socket contact groove.

* * * * *